Patented May 23, 1950

2,508,393

UNITED STATES PATENT OFFICE 2,508,393

SHORTENING

Edward B. Jaeger, Philadelphia, Pa.

No Drawing. Application November 19, 1943,
Serial No. 510,951

6 Claims. (Cl. 99—123)

This invention relates to an improved shortening for use in the production of bread dough, cake batter, and the like; and in extension contemplates not only a shortening per se, but doughs, batters, and the like, including the novel shortening and the method for their production and the baked products produced therewith.

As has been heretofore well known, fat or shortening material and moisture are essential ingredients of baked flour products, as bread, cake, and the like, and such have heretofore been incorporated in a batter or dough by the admixture of the various ingredients of a batter or dough, as sugar, flour, etc., a fat and moisture providing ingredients, as water, milk and eggs, in various order of addition and at various mixing speeds and time of mixing.

Heretofore in the compounding of batters and doughs, it has been customary to add to the mix the fat or shortening as such and substantially free from moisture. The moisture is then supplied to the mix by the addition of, for example, water, milk, eggs, and the like.

In the mixing operation the fat, moisture and the other ingredients are incorporated and to a greater or less degree blended.

Whatever the order of addition of the ingredients and however the ingredients are mixed, batters and doughs as heretofore produced have heretofore contained free fat and more or less free moisture which cannot unite in baking. Free fat under baking temperature will be reduced to oil, which will oversaturate the batter or dough ingredients, thereby retarding the baking so that the baking cannot be efficiently concluded before the expansion action of the carbon dioxide gas released by the leavening agent, such as the baking powder, has diminished to such an extent as to be ineffective. The batter and dough having been insufficiently baked at this time, the side wall cells are unable to sustain themselves, resulting in a shrinkage to the point where they can sustain themselves by compact. Control of the evaporation of moisture is also desired and sought for in the baking of flour products; and of the moisture in such products after baking.

Heretofore, in order to control the factors working against the production of desirable baked products, batters and doughs have been variously formulated with respect to the proportioning of fat and moisture, the ingredients have been put together in various order and the mixing operation has been carried out at various speeds and for various times, in order to approach the desired lightness and richness of the ideal product. However, the results obtained show wide variation in the characteristics of the products in that, for example, when desired lightness is approached, richness is sacrificed, as evidenced by a relatively dry or crumbly product, and where desired richness is obtained the product lacks lightness, as evidenced by more or less sogginess.

Now in accordance with this invention, it has been found that if the fat used as shortening in a batter or dough be incorporated with a glycerol or a propylene glycol monoester of an edible fatty acid with a substantial amount of moisture, through the medium of an emulsifying agent, to form a shortening, a modification of the other ingredients of the mix, including any added moisture, and especially of the fat and moisture, will take place with the result that in the baking operation there will be less moisture released through oven heat evaporation, insuring more moisture in the baked product and the fat, which is desired to be controlled, will be prevented from breaking down to an oil, all of which results in a baked product having superior characteristics to that produced with use of heretofore known shortenings. Variously the shortening may contain an amount of fat in excess of that to be controlled and which on baking will break down to an oil, but such amount will be insufficient to interfere with the baking process and will act to add desired richness to the product.

Thus, the shortening in accordance with this invention will comprise an emulsion comprising fat, water, a glycerol or propylene glycol monoester of an edible fatty acid and an emulsifying agent, which may be added to a batter or dough as such, or in part with addition of various of its ingredients separately or in part to the batter or dough mix with formation of the final shortening as it were in situ. Batters and doughs according to this invention will include the novel shortening, which will afford control of the fat desired to be controlled and of the moisture both within itself and within the mass of the batter or dough; and the method for their production will comprise essentially the step of adding the fat to the mix in the form of the novel shortening, which may be preformed or formed with the mix. The baked products according to this invention will comprise the baked products of batters and doughs including the novel shortening.

Shortenings according to this invention may include any of the usual fats and oils adaptable for use as shortening, as, for example, lard, a hydrogenated animal or vegetable oil, as hydrogenated cottonseed oil, or other well known shortening material, or mixtures thereof.

The glycerol or propylene glycol mono-ester of an edible fatty acid may comprise glycerol monostearate, propylene glycol monostearate, or the glycerol or propylene glycol mono-ester of peanut oil, soya bean oil, corn oil, and the like, or mixtures thereof.

The emulsifying agent included in the shortening according to this invention will be in small amount and may be any well known emulsifying agent which will not negative the edibility of the baked product in the amount used, as, for example, an animal or vegetable oil soap, an amino soap, a sulfonated alcohol, and the like, or the emulsifying agent may be formed in situ by the addition of a small amount of an alkali, such as potassium stearate, sodium stearate, potassium carbonate, potassium hydroxide, or the like, which will form a soap with the unreacted carboxyl group of the mono-ester.

The water will be present in the shortening in substantial proportion with respect to the fat and, generally speaking, will be in amount by weight about equal to say 90% by weight or greater, say up to 250% by weight, than the amount of glycerol or propylene glycol mono-ester. The amount of emulsifying agent will be small relative to the amount of mono-ester and in very small amount relative to the shortening as a whole.

The several ingredients of the novel shortening may be included in widely varying amount, it being noted that the shortening may be initially produced with the total fat content required for desired use, or that initially the fat content may be less than required or wanted and the fat, or such additional fat as is required for particular use, may be subsequently incorporated in the shortening composition before the shortening is added to a batter or dough mix, or the additional fat may be added to the mix before or after addition of the composition.

Generally, from the practical standpoint, but without limitation upon the broad scope of this invention, the ingredients of the novel shortening will be incorporated in amounts within the range shown in the following table:

| | Per cent by weight |
|---|---|
| Fat | 2–61 |
| Glycerol or propylene glycol mono-ester of an edible fatty acid | 12–30 |
| Water | 27–68 |

The emulsifying agent will be included in amount within about the range .07–10.0% by weight of the glycerol or propylene glycol mono-ester.

In making up the shortening accordingly to this invention, the ingredients will desirably be put together in any suitable manner to effect the production of a homogeneous, smooth, pastelike, emulsion. However, by way of example, an efficient product will be produced by incorporating the emulsifying agent with the mono-ester and then mixing the mono-ester with the fat and water with stirring and heating, or the mono-ester and emulsifying agent may be first mixed with the water with heating and the fat then added with stirring, or, if necessary, passing through a homogenizer. As has been indicated, less than the total amount of fat and/or less than the total amount of water may be initially incorporated with the mono-ester and emulsifying agent and subsequently additional fat and/or water added and incorporated by stirring.

As illustrative of specific embodiments of this invention, for example, a shortening adapted for use in a cake batter may be made up on the following formula:

| | Per cent by weight |
|---|---|
| Propylene glycol monostearate containing about .01% by weight of potassium stearate | 18.75 |
| Water | 18.75 |
| Fat | 62.50 |

In using the shortening on the above formula in a dough or cake batter about 20% of moisture, by weight, on the above formula would desirably be added, for example, through the addition of water, milk and/or egg material to the batter, or the shortening could be initially made up on the following formula:

| | Per cent by weight |
|---|---|
| Propylene glycol monostearate containing about .01% by weight of potassium stearate | 15 |
| Water | 34 |
| Fat | 51 |

Again, a satisfactory shortening for a dough or cake batter may be made up on the following formula:

| | Per cent by weight |
|---|---|
| Propylene glycol monostearate containing about .01% by weight of potassium stearate | 12 |
| Water | 27.20 |
| Fat | 60.80 |

Where it is desired to prepare the shortening according to this invention with less than the fat content required for use in order to minimize weight for shipping and with a view to the user making necessary addition of required fat of the type desired, a satisfactory composition can be made up on the following formula:

| | Per cent by weight |
|---|---|
| Propylene glycol monostearate containing about .01% by weight of potassium stearate | 30 |
| Water | 68 |
| Fat | 2–3, say 2 |

Prior to adding the product on the above formula to a dough or batter mix there will be added to it a fat, as a hydrogenated vegetable oil, in amount by weight of about 100%–150%, which will give a shortening, which, of course, can be made up initially on the following formula:

| | Per cent by weight |
|---|---|
| Propylene glycol monostearate containing about .01% by weight of potassium stearate | 15–12 |
| Water | 34–27.20 |
| Fat | 51–60.80 |

If desired, the additional fat may be added to the batter or dough directly before or after the addition of the composition containing less than the total desired amount of fat.

Generally speaking, in the formulation of batters and doughs using the shortening according to this invention, it will be used in amount to give a total fat content in doughs and batters substantially less than that heretofore used and found necessary. Thus, usually for a good baked flour product the shortening according to this invention will be used in amount such that the total fat content of the dough or batter will not exceed about 60% or be less than about 20% of the total fat content heretofore used in corresponding batter or dough formulae; and it has been found in practice that excellent results are obtained.

As will be appreciated, water, while necessarily present in substantial amount in the shortening according to this invention, need not be in any specific amount, since with more or less water present in the shortening the user can add less or more water, or milk to the batter or dough mix; and likewise the fat content of the shortening as originally made up may be less than required for a batter or dough mix, it being noted that additional fat to make the required amount can be added to the batter or dough mix, or it can be added to the shortening composition before the shortening composition is added to a batter or dough mix.

In use of the shortening according to this invention, it may be incorporated with any of the usual ingredients of batters and doughs for the production of cakes, bread, rolls, doughnuts, and the like, such as sugar, milk or milk powder, flour, salt, baking powder, egg, flavor, and the like, by the usual mixing procedure and in the production of the final product by baking the shortening will function in a wholly novel and different manner than do the shortenings heretofore used.

As has appeared, this invention will be found to be of the greatest advantage in enabling the production of baked products, as cake, bread, and the like, of superior quality, for example, from the standpoints of moisture keeping qualities, volume, etc., and, at the same time, with a saving of the order of 40%–75% in the amount of fat heretofore required.

This application is a continuation-in-part of my application Serial No. 467,149, filed November 27, 1942, now abandoned.

What I claim and desire to protect by Letters Patent is:

1. A shortening for batters, doughs, and the like comprising a homogeneous mixture comprising from about 12 to 30% by weight of a monoester of an edible higher fatty acid chosen from the class consisting of glycerol monoesters and propylene glycol monoesters, an emulsifying agent other than said monoesters, from about 27 to 68% of water, and a fat, said shortening combination of the monoester and the fat being capable of being used in said batter, dough and the like in an amount considerably less than the amount of fat alone that is ordinarily used.

2. The shortening of claim 1 wherein the fat is present in an amount between about 2 and 61% by weight of said shortening.

3. The shortening of claim 1 wherein the monoester is present in an amount between about 12 and 15% by weight, the water is present in amount between about 27 and 34%, and the fat is present in an amount between about 50 and 61%.

4. The shortening of claim 1 wherein the monoester is present in an amount between about 12 and 15% by weight, the water is present in an amount between about 27 and 34%, the fat is present in an amount between about 50 and 61%, and the emulsifying agent is present in an amount between about 0.01 and 10%.

5. A shortening for cake dough comprising a homogeneous mixture comprising from about 12 to 30% by weight of a monoester of an edible higher fatty acid chosen from the class consisting of glycerol monoesters and propylene glycol monoesters, an emulsifying agent other than said monoesters, from about 27 to 68% of water, and lard.

6. The shortening of claim 5 wherein the monoester is present in an amount between about 12 and 15% by weight, the water is present in an amount between about 27 and 34%, the lard is present in an amount between about 50 to 61%, and the emulsifying agent is present in an amount between about 0.1 and 10%.

EDWARD B. JAEGER.

REFERENCES CITED

The following references are of record in the file of this patent:

UNITED STATES PATENTS

| Number | Name | Date |
|---|---|---|
| 2,109,842 | Harris | Mar. 1, 1938 |
| 2,132,398 | Coith | Oct. 11, 1938 |
| 2,132,416 | Harris | Oct. 11, 1938 |
| 2,132,687 | Harris | Oct. 11, 1938 |
| 2,143,651 | Fisher | Jan. 10, 1939 |
| 2,173,203 | Harris | Sept. 19, 1939 |
| 2,223,465 | Schultz | Dec. 3, 1940 |

OTHER REFERENCES

De Navarre, "The Chemistry and Manufacture of Cosmetics," pp. 197–198, Van Nostrand, New York, 1941.

Bennett, H., "The Cosmetic Formulary," p. 10, Chemical Publishing Co., New York, 1937.

Certificate of Correction

Patent No. 2,508,393 May 23, 1950

EDWARD B. JAEGER

It is hereby certified that errors appear in the printed specification of the above numbered patent requiring correction as follows:

Column 3, line 58, for ".07–10.0%" read *.01–10.0%*; column 4, line 51, for "2–3," read *.2–3,*; column 6, line 32, for "0.1" read *0.01*;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*